April 19, 1966        C. W. J. DE GOEDEREN        3,246,887
CONTACTING TRAY WITH VARIABLE PASSAGE
Filed July 19, 1962                    2 Sheets-Sheet 1

INVENTOR:
CORNELIS W. J. DE GOEDEREN
BY Oswald H. Milmore
HIS ATTORNEY

April 19, 1966  C. W. J. DE GOEDEREN  3,246,887
CONTACTING TRAY WITH VARIABLE PASSAGE Filed July 19, 1962  2 Sheets-Sheet 2

INVENTOR:
CORNELIS W. J. DE GOEDEREN
BY: *Oswald H. Milmore*
HIS ATTORNEY

United States Patent Office 3,246,887
Patented Apr. 19, 1966

3,246,887
CONTACTING TRAY WITH VARIABLE PASSAGE
Cornelis W. J. de Goederen, Amsterdam, Netherlands, assignor to Shell Oil Company, New York, N.Y., a corporation of Delaware
Filed July 19, 1962, Ser. No. 210,995
Claims priority, application Great Britain, Sept. 29, 1961, 35,299/61
7 Claims. (Cl. 261—114)

The invention relates to contacting trays, sometimes called bubble trays, suitable for installation in a contacting column for effecting exchange between ascending gas and descending liquid, e.g., for distillation, absorption, or the like. The term "gas" is used herein to include vapor.

More particularly, the invention is concerned with contacting trays having a number of variable gas passages extending therethrough wherein the passages are controlled by valve bodies which are positioned over the passages and are supported in their lowest (closed) positions by the upper tray surface. Further, the invention is concerned with a method of fabricating valves for such trays. Columns with trays of this type are known in various embodiments, an example being described in British patent specification No. 803,711 of October 29, 1958, and U.S. Patent 2,718,901.

Contacting trays with variable passages, particularly trays with valves constructed to leave small residual openings in their lowest positions, have the attractive advantage of a satisfactory tray efficiency at very low gas loads, the efficiency at these conditions being higher than that of what are known as sieve plate trays (i.e., trays provided with openings not fitted with valves). In the latter trays the liquid drains through the passages to the lower trays at low loads without significant interaction with the ascending gas, thereby preventing sufficient contact between the liquid and gas for attaining good contacting efficiency. On the other hand, at high gas load the sieve plate tray has a higher tray efficiency than a tray provided with valves of the known constructions and subjected to the same high gas load. This may be due to the fact that the valves are still situated above the tray openings even in their fully raised or open positions, so that the gas escapes laterally into the accumulated liquid on the tray and the gas streams emanating from various adjacent tray openings collide. This may be the cause of a phenomenon observed in practice of relatively large liquid drops being carried up to the next tray by the gas at high gas loads, thereby reducing the exchange efficiency.

Valves of known construction have required various assembly operations and/or have been wasteful of metal.

An object of the invention is to combine the above-mentioned favorable characteristics of both types of trays, and thereby to provide a contacting tray having a very high capacity (i.e., permitting operation at high gas loads) and also having a great flexibility (i.e., permitting operation also at low gas loads) with good efficiencies at these varying conditions.

A further object is to provide an improved valve suitable for use in the variable-passage contacting trays which can be easily fabricated with a minimum waste of sheet metal.

According to the invention the contacting tray is provided with gas openings extending therethrough and is fitted with movable valve bodies which are positioned over the openings to vary the gas-flow passages and are, in their lowest positions, substantially horizontal and supported by the upper tray surface, each valve body being provided with a guide which retains one side of the valve body adjacently to the tray and permits an opposite side of the body to swing upwards to bring the body to an upright position in which the body is substantially clear of the opening.

By "clear of the opening" is meant that the tray opening is substantially uncovered so that gas can flow upward essentially without being deflected to the side, although the valve body may, in some embodiments, still be positioned directly above the said opening in a vertical or nearly vertical position, or may extend from the side of the opening obliquely over a small fraction of the area of the opening.

As a result of the above arrangement the tray resembles a normal sieve plate tray as regards the gas passage through the tray opening since, unlike the valves of known construction, the valve is blown entirely upwards so as to be situated entirely to one side of the tray opening (or to present only a thin edge to the upflowing gas), leaving a substantially unobstructed vertical path for the upward flow of gas from each opening in the tray. Hence at high gas loads the pressure drop across the tray is substantially the same as that which is attained with a sieve plate tray, i.e., considerably lower than that of a tray with valves which remain more or less horizontally above the tray openings in their fully open positions. This is especially important for vacuum distillation, in which the pressure drop across each tray should be as low as possible so as to maintain a low pressure and temperature in the bottom of the column. Also, by providing the free vertical path, collision of gas streams issuing from adjacent tray openings is obviated, thereby avoiding the above-noted drawback of known valves.

The guide should advantageously be constructed so that the valve body will swing back into obstructing position over the tray opening when the gas load decreases sufficiently. It is preferred to construct the guide to limit the opening movement of the valve body just short of the position at which the center of gravity is above its support, so that the valve will tend to close by gravity; however, this is not in every case essential, provided that the body does not move beyond that position so far that it reaches a stable position from which it is not readily dislodged by turbulent currents which usually occur on the tray. In the fully open positions the valve bodies usually obstruct the horizontal liquid flow on the tray, thereby increasing the liquid build-up and, hence, the residence time of the liquid on the tray. In the case of pressure distillation this results in a slight loss of capacity. To attain the same capacity as a sieve plate tray, the tray may be provided with a higher free area than the normal sieve plate tray, e.g., it may have more or larger openings. In fact, the known trays with valves are also provided with a larger number of tray openings than the sieve plate trays. The free area of the valve trays according to the invention is usually 1.2 to 1.5 times the free area of a corresponding sieve plate tray to result in the same capacity as the latter tray. In the case of vacuum distillation, the advantage of the increase in the amount of liquid on the tray is that the liquid will not be atomized or will be atomized to a lesser degree. As a result there is less entrainment of liquid drops by the ascending gas, which leads to an increase in column capacity.

The valve body and guide are, in one practical embodiment, fast to one another, i.e., rigidly attached or integrally formed from one piece of plate or sheet metal. In the latter construction the guide is composed of a single or of a plurality of strips which are separated from the valve body by one or more incisions and bent down to extend through the tray opening, and the terminal portion of the guide(s) is (are) provided with stop means positioned to catch against the under side of the tray. This permits a very simple and economical construction both as regards the consumption of material and the cost of manufacture.

The guide and stop may be integral, e.g., both cut out of the same material as the valve body, the stop being formed by arms extending laterally from the guide. By forming at least one of the arms of resilient material it can be flexed to pass through the tray opening, after which it assumes an extended position beneath the tray by resilient relaxation.

According to another practical embodiment the guide is fast to the tray, e.g., clamped thereto at the tray opening, and the valve body has a hinge-like connection to the guide. In this construction the guide may include a retaining arm which extends through a slot in the valve.

In either embodiment the configuration and dimensions of the valve bodies may be so selected that, in the lowest position, they do not completely shut off the tray opening. For example, it is possible for the valve body to have a rectangular or square outline, so that one segment of the tray opening is situated beyond the margin of the body and remains uncovered in any given position of the valve body in relation to the opening, e.g., a circular opening. This provides a residual opening at all times, as is also the case with several forms of known valve trays, which are known to give good efficiency at low gas load, as a certain minimum contact between gas and liquid is always insured. This results in a very great flexibility, which is of particular importance in distilling under pressure when high liquid loads occur at relatively low gas load, under which conditions liquid on a sieve tray of the known constructions is very liable to drain through the opening. Residual openings may also be provided by supports which extend downward from the valve body to engage the upper tray surface, e.g., by bending the corners of the valve body down, said supports occupying only a minor fraction of the perimeter of the tray opening. Further, the valve bodies may contain slots to provide the residual openings.

Such valves are very suitable for fitting to the openings of usual, existing sieve plate trays so as to effect a considerably improvement in the flexibility of said tray. The capacity of such a modified tray at full load will decrease slightly owing to the long residence time of the liquid on the tray caused by the presence of the up-turned valves on the tray, as was discussed above; but, on the other hand, the valves prevent the liquid from draining or from draining freely through the tray openings at low gas load, so that a high efficiency is maintained. Should a capacity increase be desired, i.e., up to the original capacity of the seive tray, this can be achieved in a fairly simple manner by slightly enlarging the tray openings, e.g., by drilling or reaming.

The invention will be further described with reference to the accompanying drawings showing certain preferred embodiments of the trays and showing a method for forming the valves, wherein.

Figure 1:
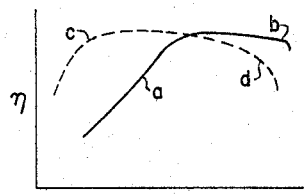
FIGURE 1 is a graph in which the performance of sieve plate trays and the so-called valve trays are compared qualitatively in terms of contacting efficiency and gas load.

Referring to FIGURE 1, the gas load $L$ is plotted as abscissae and the tray efficiency $\eta$ as ordinates. The curve $a$–$b$ (solid) relates to a sieve plate tray and the curve $c$–$d$ (dashed) to a comparable valve tray of known construction. The graph shows that the efficiency of a valve tray at higher loads is less than that of a sieve plate tray (compare the curve portions $d$ and $b$). At low gas loads, however, the valve tray has a higher efficiency (compare the curve portions $c$ and $a$). As was discussed above, a tray according to the invention combines the advantages of both such trays, so that, approximately, the efficiency would correspond to the combination of the curve sections $c$ and $b$.

Figure 2:
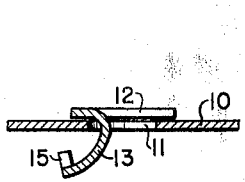
FIGURE 2 is a vertical sectional view through a part of a tray showing a valve in its lowest position.
Figure 4:
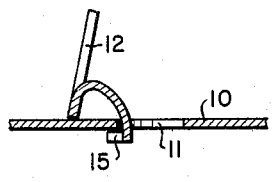
FIGURE 4 is a view corresponding to FIGURE 2 showing the valve in open position.
Figure 3:
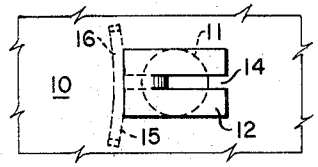
FIGURE 3 is a plan view of the parts shown in FIGURE 2.

FIGURES 2, 3 and 4 show one embodiment, wherein 10 represents a part of a contacting tray having a plurality of circular gas openings 11, only one of which appears. It will be understood that several of such trays are mounted in vertically spaced relations within a contacting column to accumulate bodies of liquid which descends in known manner from tray to tray, e.g., via downcomers or through the said gas openings. Each said opening has a valve which comprises a body 12 and a guide 13. In this embodiment the body is a flat metal plate of rectangular outline and the guide is integral therewith, obtained by making longitudinal incisions and bending the guide downwards, thereby leaving a slot or gap 14. This gap serves, at least in part, as a residual opening when the valve is closed, i.e., is in its lowermost, horizontal position, lying on the upper tray surface as is shown in FIGURE 2. The guide extends downwards through the tray opening 11 and its end is provided with a stop consisting of two arms 15 and 16, which are formed integrally with the guide and extend laterally therefrom, the distance between the extremities of the arms being greater than the diameter of the tray opening. Moreover, as appears in the drawings, the stop arms are positioned to engage the under side of the tray at a point which is displaced to one side (toward the left, as seen in the drawing) of the centroid of the area of the valve body, whereby the valve body can swing upward about the fulcrum formed by the point of engagement of these arms. This swinging movement occurs when the gas flow is sufficient to raise the valve and results in the fully open position shown in FIGURE 4, in which the valve body is positioned beside the opening 11. As also appears in this view, the stop arms 15 and 16 perferably are so dimensioned that the upward swinging movement is limited just short of the vertical, so that the valve body can fall to its lowermost position by gravity upon cessation of sufficient gas flow.

The valve may be installed by folding the arms 15 and 16 together to pass through the opening 11 and spreading them to the positions shown, working from below the tray.

Figure 10:
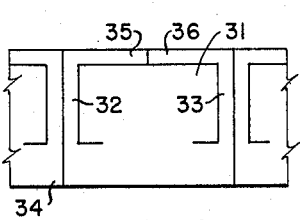
FIGURE 10 is a plan view of a third blank from which valves of a modified construction, using dual guides, are made.
Figure 11:
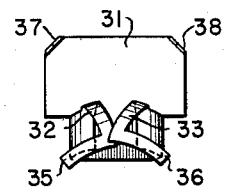
FIGURE 11 is a bottom plan view of the valve made from the blank of FIGURE 10.

Because the valve has a guide only at one extremity (only a single guide being provided in this embodiment, although several may be used, as will appear in connection with FIGURES 10 and 11), the position of the valve relative to the tray opening is not fixed; instead, the valve can slide horizontally and rotate when in its lowest position, as is evident from FIGURES 2 and 3. The guide 13 can, therefore, occupy any position within the tray opening, so that the valve body has a corresponding freedom of movement. In fact, there is no question of the valve staying for a long period in any one position during operation since the valves are to some extent kept in motion by the moving fluids being contacted. The valves thereby exert a grinding or scraping action on the tray surface, to keep the juxtaposed tray and valve surfaces clean from deposits which could otherwise cause sticking. It is possible for the residual opening of a valve to be defined both by the gap 14 and by segment-shaped opening at one or more sides of the valve. The segment-shaped openings at the side or sides of the valve body will increase with a simultaneous decrease in the opening left by the gap 14. By a choice of the width of the valve and/or its configuration the total residual flow passage can be made more or less independent of the position of the valve. The length of the valve body is advantageously sufficient to span the tray opening substantially in all positions.

The valves can also occupy different positions when in the fully open position of FIGURE 4. The final position, i.e., that at which it comes to rest on the tray, is influenced by the flow of the gas and liquid; because of the slight inclination, gas will tend to blow it to the extreme position shown in the drawing, entirely beside the opening, but the flow of liquid across the tray can in some cases overcome the gas action. When the supporting edge of the open valve extends across a part of the opening 11 the valve body is still substantially clear of the opening 11.

Figure 5:
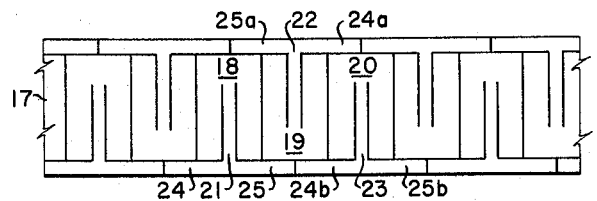
FIGURE 5 is a plan view of a blank from which a series of valves are made by stamping.

FIGURE 5 shows the method of forming a number of valves from a single rectangular sheet-metal blank 17, from which any desired number of valves can be formed. The rectangular valves 18, 19, 20, and so on, are stamped by making incisions along all lines shown. The parts 21, 22 and 23 are then bent downward to serve as guides and the horizontal arms 24–25, 24a–25a and 24b–25b, each pair forming the top of a T at the end of a guide, serve as stops. In this embodiment the lengths of these arms are equal, whereby the valves are symmetrical about the central longitudinal axis.

Figure 7:
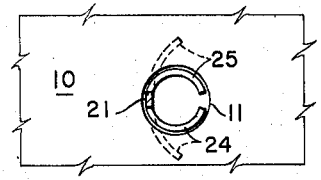
FIGURE 7 is a sectional view taken on the line 7—7 of FIGURE 6, the final position being shown in dotted lines.
Figure 6:
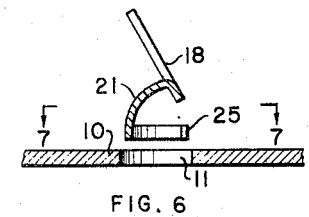
FIGURE 6 is a vertical sectional view through a part of a tray showing a modified method of installing the valve.

A method of installing such valves by working only from above the tray is shown in FIGURES 6 and 7 and is applicable to any valve wherein the stop arms are flexible, whether resilient or not. When not resilient, the stop arms 24 and 25 at the lower end of the guide 21 are bent to a circular shape to fit through the tray opening 11, and after passage the arms are bent outward. The latter bending is accomplished from above the tray with the aid of special expanding pliers, to move the arms to the dotted line position of FIGURE 7. When the arms are resilient they are curved resiliently to the shape shown in solid lines and spring to extended position after passing through the hole 11.

Figure 8:
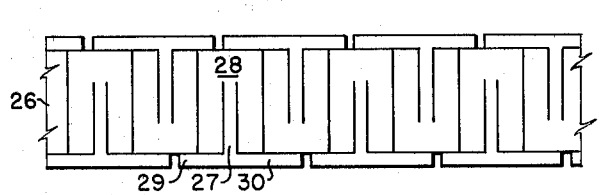
FIGURE 8 is a plan view of another blank from which valves according to a modified construction are made.
Figure 9:
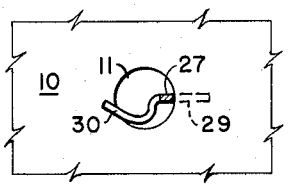
FIGURE 9 is a sectional view, corresponding to FIGURE 7, showing the installation of a valve made from the blank of FIGURE 8.

FIGURE 8 corresponds to FIGURE 5 but shows a modified blank 26 wherein the stop arms are of unequal length. The guide 27 on valve body 28 has a short arm 29 and a long arm 30. The other valves in the blank have the same shape. This construction is especially suitable when the blank is of resilient metal for installation as shown in FIGURE 9. In this embodiment the shorter arm 29 is left straight and the longer arm 30 is curved to the shape shown. The arm 29 is passed through the opening 11 first, followed by the arm 30. The latter is deformed resiliently to pass through the opening and clicks resiliently into extended position as soon as it has passed the opening, so that the stop will retain the valve in position.

Figure 13:
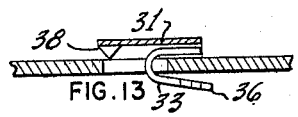
FIGURE 13 is a sectional view taken on the line 13—13 of FIGURE 12.
Figure 12:
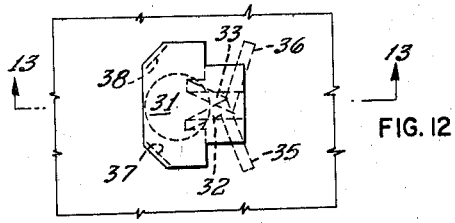
FIGURE 12 is a plan view of a part of the tray showing the valve of FIGURES 10 and 11 in closed position.

FIGURES 10 and 11 show a modified construction in which the valve body 31 is imperforate and provided with dual guides 32, 33, and FIGURES 12 and 13 show that valve installed in a tray. FIGURE 10 shows a sheet metal blank 34 from which several valves are fabricated. Incisions are made by stamping along all solid lines shown to form any desired number of valves. This operation provides stops 35 and 36 at the ends of the arms. During or after stamping the corners 37 and 38 may be bent down slightly so as to form supports which engage the upper tray surface and enable the principal part of the valve in the fully closed position to rest in spaced relation above the tray. This prevents sticking and provides a residual passage for the upward flow of gas when the valve is in closed position.

After stamping the guides 32 and 33 are bent downward and the stops 35 and 36 are bent outward, as shown in FIGURES 11–13 for engaging the under side of the tray. The final bending operation may be effected after insertion through the tray opening.

Figure 14:
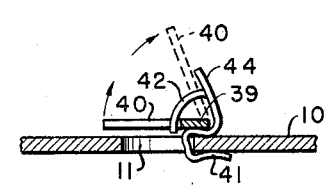
FIGURE 14 is a vertical sectional view through a part of a tray showing a further embodiment of a valve wherein the guide is fast to the tray, the valve being shown in its lowest position in solid and in open position in dotted lines.
Figure 15:
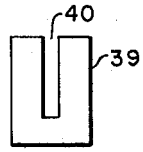
FIGURE 15 is a plan view of the valve of FIGURE 14.
Figure 16:
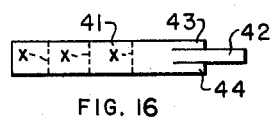
FIGURE 16 is a plan view of a blank form which the guide of FIGURE 14 is made.

FIGURES 14, 15, and 16 show an embodiment wherein the guide is fast to the tray and the valves have a hinge-like connection. The valve body consists of a flat, U-shaped plate 39 having an open longitudinal slot 40. The guide 41, formed from a blank as shown in FIGURE 16, is of resilient metal and is bent along the dotted lines x to the shape shown to permit it to be clamped to the tray at the edge of the opening 11. The guide further includes a retaining arm 42 which is bent to the special, generally arcuate shape shown from adjacent tabs 43, 44 after making parallel incisions. The retaining arm extends through the slot 40. The tabs 43 and 44 extend upwards to form stops limiting the upward movement of the valve to a position from which it can fall by gravity.

A particular advantage of this construction is that the valve in its open position has a determined location, so that the liquid flow resistance over the tray can be decreased by a suitable choice of its location or orientation.

It will be understood that the invention is not limited to valves having rectangular outlines, and other shapes, e.g., circular, may be used. If desired, the valves may have a considerably larger surface area than the tray opening to which they are fitted, for example, when it is desired that the residual opening in the fully closed position of the valve be constantly determined by the gap in the body and/or by the space between the tray surface and the valve body.

*Example*

Figure 17:
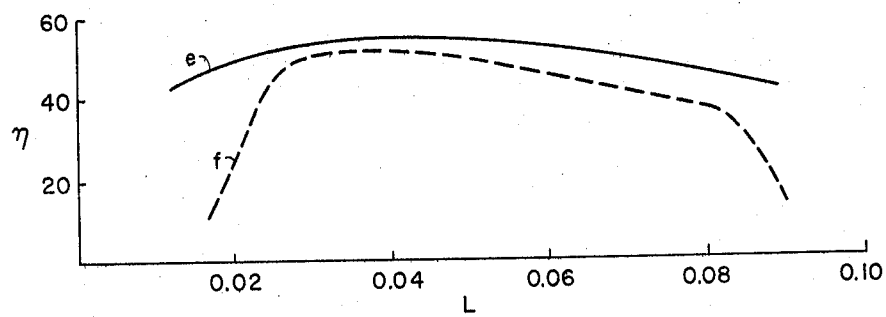
FIGURES 17 and 18 are graphs showing, respectively, the contacting efficiencies and pressure drops per theoretical plate as a function of gas load for the tray according to the invention and a sieve tray.
Figure 18:
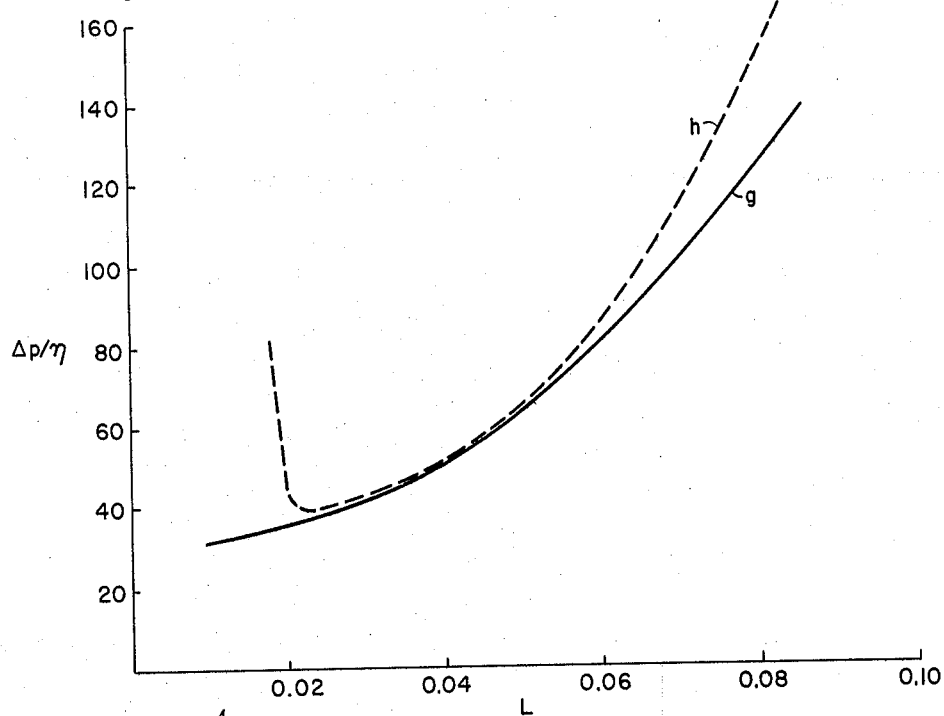

The effectiveness of the valves according to the invention is shown in FIGURES 17 and 18, which present test results obtained by a valve constructed as shown in FIGURES 4, 8 and 9, in a distillation column having a diameter of 0.45 meter, using a mixture of ethylene glycol and propylene glycol under vacuum conditions at a pressure of 50 mm. Hg. The trays were provided with liquid downcomers, had circular openings providing an aggregate free area of 16.3%, and the diameter of each opening was 15 mm. When the valves were installed, the flow passage varied from approximately 6% with the valves in closed position to approximately 16% in the fully open position.

The valves operated fully satisfactory at all loads tested, as indicated by the curves, whereon gas loads were plotted as abscissae. The load factor L is here defined as $$L = U_0 (S_V/S_L)^{1/2}$$

where $S_V$ is the vapor density and $S_L$ the liquid density, in like units, and $U_0$ is the superficial vapor velocity.

FIGURE 17 shows the tray efficiency $\eta$ as ordinates and shows, in the solid curve e, the performance of the above-described tray equipped with valves and, in the dashed curve f, that for the sieve plate tray without valves. Comparing these curves with those of FIGURE 1 is evident that the trays according to the invention attained the high efficiency of the simple sieve plate tray at high loading while retaining the advantage of the valved tray at low loadings.

In FIGURE 18 the pressure drop across the tray per theoretical contacting stage are ploted as ordinates, and the solid curve g and the dashed curve h again give the performance of the valved and non-valved trays. It is evident that low pressure drops per theoretical stage were attained with the tray according to the invention.

I claim as my invention:
1. A gas-liquid contacting apparatus which comprises:
   (a) a contacting tray adapted to be mounted horizontally within a contacting column to retain a body of liquid thereon and having at least one flow opening therethrough,
   (b) a valve body movably mounted above the tray over said opening and being, when in its lowermost position, substantially horizontal and supported by the upper tray surface, and
   (c) guide means connected to said tray and fast to said valve body for retaining one side of the valve body adjacently to the tray while permitting the opposite side to swing upwards to a raised position in which the space above said opening is substantially unobstructed by said valve body, said guide means including:
      (1) an upper part which extends downwards from the body through said tray opening, and
      (2) stop means at the lower end of said guide means for engaging the under side of the tray when the body is swung clear of the opening and situated to one side of the centroid of the valve body area.

2. A gas-liquid contacting apparatus as defined in claim 1 wherein said guide means is integral with the valve body and is constituted by a downwardly bent strip of the body, separated therefrom by an incision.

3. A gas-liquid contacting apparatus as defined in claim 2 wherein said strip is bent down from an interior part of the body, whereby said body has an open slot.

4. A gas-liquid contacting apparatus as defined in claim 2 wherein said guide means is dual and includes a pair of strips bent down from marginal parts of the body.

5. A gas-liquid contacting apparatus as defined in claim 1 wherein said stop means includes a pair of arms extending in opposite directions laterally from the guide means.

6. A gas-liquid contacting apparatus as defined in claim 5 wherein said arms are of substantially equal length.

7. A gas-liquid contacting apparatus as defined in claim 5 wherein at least one of said arms is of resilient material, whereby it can be deflected to pass through the said tray opening during installation.

References Cited by the Examiner

UNITED STATES PATENTS

| | | | |
|---|---|---|---|
| 948,432 | 2/1910 | Rudeen | 261—114 |
| 2,658,737 | 11/1953 | Nutter | 261—114 |
| 2,718,901 | 9/1955 | Nutter | 261—114 |
| 2,846,204 | 8/1958 | Gilmore | 261—114 |
| 3,019,003 | 1/1962 | Glitsch | 261—114 |
| 3,080,155 | 3/1963 | Glitsch et al. | 261—114 |
| 3,105,862 | 10/1963 | Doering | 261—114 |

FOREIGN PATENTS 843,280  8/1960  Great Britain.

HARRY B. THORNTON, *Primary Examiner.*
HERBERT L. MARTIN, *Examiner.*